UNITED STATES PATENT OFFICE.

JULIUS BRACE, OF COVINGTON, KENTUCKY.

IMPROVEMENT IN PRESERVING MEATS.

Specification forming part of Letters Patent No. 200,248, dated February 12, 1878; application filed April 7, 1877.

*To all whom it may concern:*

Be it known that I, JULIUS BRACE, of Covington, in the county of Kenton and State of Kentucky, have invented certain new and useful Improvements in Hermetical Casings for Preserving Meat, Ham, &c., and in the process of coating the canvas or casing, of which the following is a specification:

My invention relates to the preserving of cured meats, such as ham, bacon, dried beef, and other articles.

My invention also relates to the process of hermetically casing bacon or other articles in a tough, elastic coating, in the manner hereinafter explained.

It consists of a hermetical tight casing or coating of asphaltum of the proper consistency, applied to any proper wrapping material used to incase the article to be protected.

The meat or article to be protected is first wrapped in paper and then inclosed in a tight-fitting muslin or canvas sack, in the manner usually employed for hams, &c. It is then treated to a coating of asphaltum, which may be applied in the following manner: I take asphaltum, (the pure native asphaltum from the Island of Cuba is the best,) place it in a suitable kettle, and mix with it a lighter hydrocarbon, enough of which must be used to make, when cold, a firm, tough, elastic wax. For tempering the asphaltum, the residuum from the distillation of petroleum is preferred. The asphaltum is melted and assimilated over a slow fire, and the mass raised to a temperature of, say, 300° Fahrenheit. The article to be treated, wrapped as before described, is then plunged into the liquid asphaltum heated, and held long enough to allow the air between the canvas and ham to escape, and allowed to drip a few seconds; and before the coating of asphaltum which adheres to the canvas is fully cooled, the coated article should be rolled in the dust of carbonate of lime, ground slate, or other impalpable powder, which dust prevents the coating from being sticky. The dust adheres more readily when it is heated.

When the asphaltum coating is thoroughly cooled or set, the meat can be stored or shipped, as desired.

The use of the heated powder is not essential to the coating; but it is generally desirable to use it.

The use of paper as a wrapping, and of muslin or canvas sacking, is the best mode of wrapping, as they prevent the heated asphaltum from striking through, and coming in contact with the meat, while the muslin or canvas forms the best surface for the asphaltum to adhere to, and form, as it must, a tight casing, impervious to air or moisture.

The various steps of my process may be variously modified without departing from my invention. Thus, the dust may be omitted, or it may be mixed with the heated asphaltum; but the coating will not be as good as when applied in the manner herein described.

The following are some of the advantages derived by the use of my invention:

I am enabled to effectually hermetically incase meat in a light, tough casing, capable of being handled and shipped without injury to the casing. It thoroughly excludes the air, and, being impervious to moisture, is a great prevention of mold, which other forms of sacking meat are subject to.

When the coating is made from pure mineral asphaltum, it will not affect in the least the taste or the smell of the meat or article incased.

Again, the elasticity of the material composing the coating renders it very tough and durable. It is also very cheap material, and the mode of using simple.

Another important advantage is the complete protection of the article incased from insects and larvæ.

Ham or cured meat incased as herein described will keep entirely sweet and pure for an indefinite period.

Again the hermetical casing prevents the meats from drying and loss of weight by evaporization, preserving the juices and the flavor, which is a very important advantage.

Other bituminous or resinous substances of like character to the asphaltum may be employed; but 1 deem the asphaltum the best.

What I claim as my invention is—

1. The process herein described of preserving hams and other articles of food by wrapping them first in paper or similar material, and then inclosing the same in canvas or other similar material, and hermetically sealing the same by a coating of asphaltum, substantially as set forth.

2. A hermetical casing for articles of food, consisting of a receptacle of canvas coated or saturated with asphaltum, substantially as set forth.

In testimony whereof I have hereunto set my hand this 3d day of April, 1877.

JULIUS BRACE.

Witnesses:
E. P. BRADSTREET,
E. G. WOOD.